US010412207B2

United States Patent
Tian et al.

(10) Patent No.: US 10,412,207 B2
(45) Date of Patent: *Sep. 10, 2019

(54) MOBILE TERMINAL, POWER ADAPTER, AND UPGRADE METHOD THEREOF

(71) Applicant: Guangdong Oppo Mobile Telecommunications Corp., Ltd., Dongguan (CN)

(72) Inventors: Chen Tian, Dongguan (CN); Jialiang Zhang, Dongguan (CN); Jun Zhang, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 286 days.

This patent is subject to a terminal disclaimer.

(21) Appl. No.: 15/312,648

(22) PCT Filed: Sep. 24, 2015

(86) PCT No.: PCT/CN2015/090622
§ 371 (c)(1),
(2) Date: Nov. 20, 2016

(87) PCT Pub. No.: WO2017/049553
PCT Pub. Date: Mar. 30, 2017

(65) Prior Publication Data
US 2017/0289334 A1 Oct. 5, 2017

(51) Int. Cl.
*H04W 4/50* (2018.01)
*H04M 1/725* (2006.01)
(Continued)

(52) U.S. Cl.
CPC ....... *H04M 1/72525* (2013.01); *H02J 7/0052* (2013.01); *H04L 12/40045* (2013.01);
(Continued)

(58) Field of Classification Search
CPC ... H04L 67/34; H04L 41/082; H04L 67/2823; H04L 67/125; H04W 88/02; H04W 4/50; B64F 1/28
See application file for complete search history.

(56) References Cited

U.S. PATENT DOCUMENTS 9,431,831 B1 * 8/2016 Richardson ............. G06F 1/263
2003/0076072 A1 * 4/2003 Tojo .................. G01R 31/3648
320/134
(Continued)

FOREIGN PATENT DOCUMENTS

CN 101937414 A 1/2011
CN 102185942 A 9/2011
(Continued)

OTHER PUBLICATIONS

SIPO, First Office Action for CN Application No. 201580013183, dated Jan. 11, 2019.

*Primary Examiner* — Lester G Kincaid
*Assistant Examiner* — Dung L Lam
(74) *Attorney, Agent, or Firm* — Hodgson Russ LLP (57) ABSTRACT

A mobile terminal, a power adapter, and an upgrade method are disclosed. The method includes: downloading software upgrade information of the power adapter by a mobile terminal, the software upgrade information being upgrade software of the power adapter; and transmitting the software upgrade information to a processor of the power adapter by the mobile terminal through a data line in a charging port during a process that the mobile terminal is connected to the power adapter through the charging port to facilitate the processor to upgrade the software of the power adapter according to the software upgrade information. The mobile terminal downloads the software upgrade information, and the most updated software upgrade information is transmitted to the power adapter during the process that the mobile (Continued)

terminal connects to the power adapter, the power adapter is upgraded to solve the problem that the power adapter is difficult to upgrade.

14 Claims, 5 Drawing Sheets

(51) Int. Cl.
    *H04W 88/02*     (2009.01)
    *H02J 7/00*     (2006.01)
    *H04L 12/40*     (2006.01)
    *H04L 12/24*     (2006.01)
    *H04L 29/06*     (2006.01)
    *H04L 29/08*     (2006.01)

(52) U.S. Cl.
    CPC ........ *H04L 41/082* (2013.01); *H04L 67/2823* (2013.01); *H04L 67/34* (2013.01); *H04L 69/08* (2013.01); *H04W 4/50* (2018.02); *H04W 88/02* (2013.01); *H02J 2007/0062* (2013.01); *H02J 2007/0096* (2013.01)

(56) References Cited

U.S. PATENT DOCUMENTS

| | | | |
|---|---|---|---|
| 2009/0240852 A1* | 9/2009 | Gou | G06F 13/385 710/63 |
| 2014/0075061 A1* | 3/2014 | Fritchman | G06F 1/1632 710/62 |
| 2014/0081940 A1* | 3/2014 | Everett | H02J 7/0004 707/705 |
| 2017/0269922 A1 | 9/2017 | Tian et al. | |

FOREIGN PATENT DOCUMENTS

| | | |
|---|---|---|
| CN | 102931709 A | 2/2013 |
| CN | 203135171 | 8/2013 |
| CN | 103683977 A | 3/2014 |
| CN | 104239097 A | 12/2014 |
| CN | 204424942 U | 6/2015 |
| CN | 104753130 A | 7/2015 |
| CN | 106471789 A | 3/2017 |
| EP | 1175112 A1 | 1/2002 |

\* cited by examiner

```
                                                                    ┌ 710
The power adapter receives the software upgrade information of the power
adapter from the mobile terminal through the data line in the charging port
during the process that the power adapter is connected to the mobile
terminal through the charging port.

┌ 720
The processor of the power adapter upgrades the software of the power
adapter according to the software upgrade information.
```

MOBILE TERMINAL, POWER ADAPTER, AND UPGRADE METHOD THEREOF

CROSS REFERENCE TO RELATED APPLICATION

This is the U.S. National Stage of International Application No. PCT/CN2015/090622, filed on Sep. 24, 2015, the content of which are incorporated herein by reference in their entirety.

BACKGROUND OF THE DISCLOSURE

1. Field of the Disclosure

The present disclosure relates to a mobile terminal, and more particularly, to a mobile terminal, a power adapter, and an upgrade method thereof.

2. Description of the Related Art

Nowadays, in order to meet quick charging requirements, power adapters of some mobile terminal (such as a cell phone) manufacturers are designed to be intelligent power adapters. Take the VOOC flash charging technology of OPPO Mobile Communications Co., Ltd. for example, a control core of the power adapter is a microcontroller unit (MCU). Under control of the MCU, the OPPO power adapter can adjust its own operation mode according to a current state.

As we all know, MCU features are programmable. That is, the MCU is able to achieve different functions through changing of software code, and only those MCUs downloaded with new programs can be equipped with new functions. Hence, in order to allow the MCU to become the control core of the power adapter, corresponding programs need to be downloaded for the MCU.

Currently, downloading of the programs is performed on a production line so that a problem exists. If the program is found to have a bug after the power adapter is sold, the program needs to be modified. Or, if a new function is added to the power adapter, then the power adapters that have been sold need to be retuned to the manufacturer to be upgraded under the current situation. Returns to the manufacturer consume time and manpower. Therefore, the problem that the power adapter is difficult to upgrade needs to be solved.

SUMMARY OF THE INVENTION

Embodiments of the present disclosure provide a mobile terminal, a power adapter and an upgrade method thereof to solve the problem that the power adapter is difficult to upgrade.

In a first aspect of at least one embodiment, a method of upgrading a power adapter is provided. The method includes: downloading software upgrade information of the power adapter by a mobile terminal, the software upgrade information being configured to upgrade software of the power adapter; and transmitting the software upgrade information to a processor of the power adapter by the mobile terminal through a data line in a charging port during a process that the mobile terminal is connected to the power adapter through the charging port to facilitate the processor to upgrade the software of the power adapter according to the software upgrade information.

According to an embodiment in conjunction to the first aspect of the present disclosure, the mobile terminal transmits the software upgrade information to the processor of the power adapter through the data line in the charging port includes: converting the software upgrade information to data in a Universal Asynchronous Receiver/Transmitter (UART) format by the mobile terminal; and transmitting the data in UART format to a UART port of the processor of the power adapter by the mobile terminal through the data line in the charging port.

According to an embodiment in conjunction to the first aspect of the present disclosure, the mobile terminal converts the software upgrade information into the data in the UART format comprises: converting downloaded software upgrade information into data in an I2C format by an AP of the mobile terminal; utilizing an I2C port by the AP of the mobile terminal to transmit the data in the I2C format to an MCU of the mobile terminal; and converting the data in the I2C format into the data in the UART format by the MCU of the mobile terminal to transmit the data in the UART format to the UART port of the processor of the power adapter by the MCU of the mobile terminal through the data line in the charging port.

According to an embodiment in conjunction to the first aspect of the present disclosure, the method further includes transmitting a handshake request message to the power adapter by the MCU of the mobile terminal, the handshake request message being configured to enquire about a version of the software currently used by the power adapter;

receiving a handshake response message transmitted by the power adapter by the MCU of the mobile terminal, the handshake response message including a message configured to indicate the version of the software currently used by the power adapter; and determining whether the software currently used by the power adapter needs to be upgraded by the MCU of the mobile terminal according to the version of the software currently used by the power adapter and a most updated version indicated by the downloaded software upgrade information; transmitting the data in the UART format to the UART port of the processor of the power adapter by the MCU of the mobile terminal including: transmitting the data in the UART format to the UART port of the processor of the power adapter by the MCU of the mobile terminal when determining that the software currently used by the power adapter needs to be upgraded.

According to an embodiment in conjunction to the first aspect of the present disclosure, the method further includes determining whether a power supply device plugged in is the power adapter by the AP of the mobile terminal through a first link, wherein the first link connects a USB port of the AP and the charging port; and switching the mobile terminal from the first link to a second link through the USB switch when determining that the power supply device plugged in is the power adapter, wherein the second link connects the MCU of the mobile terminal and the charging port; transmitting the data in the UART format to the UART port of the processor of the power adapter by the MCU of the mobile terminal including: transmitting the data in the UART format to the UART port of the processor of the power adapter by the MCU of the mobile terminal through the second link.

According to an embodiment in conjunction to the first aspect of the present disclosure, the software upgrade information is information downloaded from network by the AP in the mobile terminal through a radio frequency controller.

According to an embodiment in conjunction to the first aspect of the present disclosure, the mobile terminal transmits the software upgrade information to the processor of the power adapter through the data line in the charging port during the process that the mobile terminal is connected to the power adapter through the charging port includes: transmitting the software upgrade information to the processor of the power adapter by the mobile terminal through the data line in the charging port during a process that the power adapter uses a normal charging mode to charge the mobile terminal. The method further includes: switching the mobile terminal from the normal charging mode to a quick charging mode after the power adapter upgrades the software of the power adapter according to the software upgrade information, wherein a charging speed of the quick charging mode is greater than a charging speed of the normal charging mode.

According to an embodiment in conjunction to the first aspect of the present disclosure, the charging port is the USB port, the data line in the charging port is at least one of D+ line and D− line in the USB port.

In a second aspect of at least one embodiment, a method of upgrading a power adapter is provided. The method includes: receiving software upgrade information of the power adapter from a mobile terminal by the power adapter through a data line in a charging port during a process that the power adapter is connected to the mobile terminal through the charging port; and upgrading software of the power adapter by a processor of the power adapter according to the software upgrade information.

According to an embodiment in conjunction to the second aspect of the present disclosure, the power adapter receives the software upgrade information of the power adapter from the mobile terminal through the data line in the charging port includes: receiving data in a Universal Asynchronous Receiver/Transmitter (UART) format transmitted by the mobile terminal by the power adapter through a UART port of the processor, wherein the data in UART format is formed by converting the software upgrade information by the mobile terminal.

According to an embodiment in conjunction to the second aspect of the present disclosure, receiving the data in the UART format transmitted by the mobile terminal by the power adapter through the UART port of the processor includes: receiving the data in the UART format transmitted by the MCU of the mobile terminal by the power adapter through the UART port of the processor, wherein the data in the UART format is formed by converting the software upgrade information in an I2C format received from an AP of the mobile terminal through the MCU of the mobile terminal.

According to an embodiment in conjunction to the second aspect of the present disclosure, the software upgrade information is information downloaded from network by the AP in the mobile terminal through a radio frequency controller.

According to an embodiment in conjunction to the second aspect of the present disclosure, the method further includes: receiving a handshake request message from the mobile terminal by the power adapter, the handshake request message being configured to enquire about a version of the software currently used by the power adapter; and transmitting a handshake response message to the mobile terminal by the power adapter, the handshake response message including a message configured to indicate the version of the software currently used by the power adapter; receiving the software upgrade information of the power adapter from the mobile terminal by the power adapter including: receiving the software upgrade information of the power adapter from the mobile terminal by the power adapter when the mobile terminal determines that the software currently used by the power adapter needs to be upgraded according to a most updated version indicated by the software upgrade information.

According to an embodiment in conjunction to the second aspect of the present disclosure, the power adapter receives the software upgrade information of the power adapter from the mobile terminal through the data line in the charging port during the process that the power adapter is connected to the mobile terminal through the charging port includes: receiving the software upgrade information of the power adapter from the mobile terminal by the power adapter through the data line in the charging port during a process that the power adapter uses a normal charging mode to charge the mobile terminal. The method further includes: switching the power adapter from the normal charging mode to a quick charging mode after the power adapter upgrades the software of the power adapter according to the software upgrade information, wherein a charging speed of the quick charging mode is greater than a charging speed of the normal charging mode.

According to an embodiment in conjunction to the second aspect of the present disclosure, the charging port is a USB port, the data line in the charging port is at least one of D+ line and D− line in the USB port.

In a third aspect of at least one embodiment, a mobile terminal is provided. The mobile terminal includes: a download controller configured to download software upgrade information of a power adapter, the software upgrade information being configured to upgrade software of the power adapter; and a first sending controller configured to transmit the software upgrade information to a processor of the power adapter through a data line in a charging port during a process that the mobile terminal is connected to the power adapter through the charging port to facilitate the processor to upgrade the software of the power adapter according to the software upgrade information.

According to an embodiment in conjunction to the third aspect of the present disclosure, the first sending controller is configured to convert the software upgrade information into data in a Universal Asynchronous Receiver/Transmitter (UART) format; transmit the data in UART format to a UART port of the processor of the power adapter through the data line in the charging port.

According to an embodiment in conjunction to the third aspect of the present disclosure, the first sending controller is configured to convert downloaded software upgrade information into data in an I2C format through an AP of the mobile terminal; utilize an I2C port to transmit the data in the I2C format to an MCU of the mobile terminal though the AP of the mobile terminal; convert the data in the I2C format into the data in the UART format through the MCU of the mobile terminal to transmit the data in the UART format to the UART port of the processor of the power adapter through the data line in the charging port.

According to an embodiment in conjunction to the third aspect of the present disclosure, the software upgrade information is information downloaded from network by the AP in the mobile terminal through a radio frequency controller.

According to an embodiment in conjunction to the third aspect of the present disclosure, the mobile terminal further includes: a second sending controller configured to transmit a handshake request message to the power adapter through the MCU of the mobile terminal, the handshake request message being configured to enquire about a version of the software currently used by the power adapter; a receiving controller configured to receive a handshake response message transmitted by the power adapter through the MCU of the mobile terminal, the handshake response message including a message configured to indicate the version of the software currently used by the power adapter; and a determination controller configured to determine whether the software currently used by the power adapter needs to be upgraded according to the version of the software currently used by the power adapter and a most updated version indicated by the downloaded software upgrade information. The first sending controller is configured to transmit the data in UART format to the UART port of the processor of the power adapter through the MCU of the mobile terminal when determining that the software currently used by the power adapter needs to be upgraded.

According to an embodiment in conjunction to the third aspect of the present disclosure, the mobile terminal further includes: a judge controller configured to determine whether a power supply device plugged in is the power adapter through a first link, wherein the first link connects a USB port of the AP and the charging port; and a link switching controller configured to switch the mobile terminal from the first link to a second link through the USB switch when determining that the power supply device plugged in is the power adapter, wherein the second link connects the MCU of the mobile terminal and the charging port. The first sending controller is configured to transmit the data in UART format to the UART port of the processor of the power adapter through the second link.

According to an embodiment in conjunction to the third aspect of the present disclosure, the software upgrade information is information downloaded from network by the AP in the mobile terminal through a radio frequency controller.

According to an embodiment in conjunction to the third aspect of the present disclosure, the first sending controller is configured to transmit the software upgrade information to the processor of the power adapter through the data line in the charging port during a process that the power adapter uses a normal charging mode to charge the mobile terminal, the mobile terminal further includes: a switch controller configured to switch the power adapter from the normal charging mode to the quick charging mode after the power adapter upgrades the software of the power adapter according to the software upgrade information, wherein a charging speed of the quick charging mode is greater than a charging speed of the normal charging mode.

According to an embodiment in conjunction to the third aspect of the present disclosure, the charging port is the USB port, the data line in the charging port is at least one of D+ line and D− line in the USB port.

In a fourth aspect of at least one embodiment, a power adapter is provided. The power adapter includes: a first receiving controller configured to receive software upgrade information of the power adapter from a mobile terminal through a data line in a charging port during a process that the power adapter is connected to the mobile terminal through the charging port; and an upgrade controller configured to upgrade software of the power adapter through the processor of the power adapter according to the software upgrade information.

According to an embodiment in conjunction to the fourth aspect of the present disclosure, the first receiving controller is configured to receive data in a Universal Asynchronous Receiver/Transmitter (UART) format transmitted by the mobile terminal through a UART port of the processor, wherein the data in UART format is formed by converting the software upgrade information by the mobile terminal.

According to an embodiment in conjunction to the fourth aspect of the present disclosure, the first receiving controller is configured to receive the data in the UART format transmitted by an MCU of the mobile terminal through the UART port of the processor, wherein the data in the UART format is formed by converting the software upgrade information in an I2C format received from an AP of the mobile terminal through the MCU of the mobile terminal.

According to an embodiment in conjunction to the fourth aspect of the present disclosure, the software upgrade information is information downloaded from network by the AP in the mobile terminal through a radio frequency controller.

According to an embodiment in conjunction to the fourth aspect of the present disclosure, the power adapter further includes: a second receiving controller configured to receive a handshake request message from the mobile terminal, the handshake request message being configured to enquire about a version of the software currently used by the power adapter; and a sending controller configured to transmit a handshake response message to the mobile terminal, the handshake response message including a message configured to indicate the version of the software currently used by the power adapter. The first receiving controller is configured to receive the software upgrade information of the power adapter from the mobile terminal when the mobile terminal determines that the software currently used by the power adapter needs to be upgraded according to a most updated version indicated by the software upgrade information.

According to an embodiment in conjunction to the fourth aspect of the present disclosure, the first receiving controller is configured to receive the software upgrade information of the power adapter from the mobile terminal by the power adapter through the data line in the charging port during a process that the power adapter uses a normal charging mode to charge the mobile terminal. The power adapter further includes: a switch controller, configured to switch the power adapter from the normal charging mode to the quick charging mode after the power adapter upgrades the software of the power adapter according to the software upgrade information. A charging speed of the quick charging mode is greater than a charging speed of the normal charging mode.

According to an embodiment in conjunction to the fourth aspect of the present disclosure, the charging port is a USB port, the data line in the charging port is at least one of D+ line and D− line in the USB port.

According to the embodiments of the present disclosure, the mobile terminal is utilized to download the software upgrade information of the power adapter, and the most updated software upgrade information is transmitted to the power adapter during the process that the mobile terminal is connected to the power adapter, the power adapter is thus upgraded to solve the problem that the power adapter is difficult to upgrade.

BRIEF DESCRIPTION OF THE DRAWINGS

In order to more clearly illustrate the embodiments of the present disclosure or related art, the following figures will be described in the embodiments are briefly introduced. It is obvious that the drawings are merely some embodiments of the present disclosure, those of ordinary skill in this field can obtain other figures according to these figures without paying the premise.

DETAILED DESCRIPTION OF THE PREFERRED EMBODIMENTS

For the purpose of description rather than limitation, the following provides such specific details as a specific system structure, interface, and technology for a thorough understanding of the application. However, it is understandable by persons skilled in the art that the application can also be implemented in other embodiments not providing such specific details. In other cases, details of a well-known apparatus, circuit and method are omitted to avoid hindering the description of the application by unnecessary details.

Current power adapters do not include radio frequency controllers. The current power adapters thus cannot behave like mobile terminals that are able to conveniently download upgrade information through over the air (OTA) technology to be upgraded. Hence, embodiments of the present disclosure utilize the mobile terminal to download software upgrade information of the power adapter, and transmit the software upgrade information downloaded to the processor of the power adapter through the charging port between the mobile terminal and the power adapter during the process that the mobile terminal is connected to the power adapter so as to facilitate the processor of the power adapter to upgrade by using the software upgrade information. Reference will now be made to the embodiments to describe the upgrade method of the power adapter according to the embodiments of the present disclosure in detail.

Figure 1:
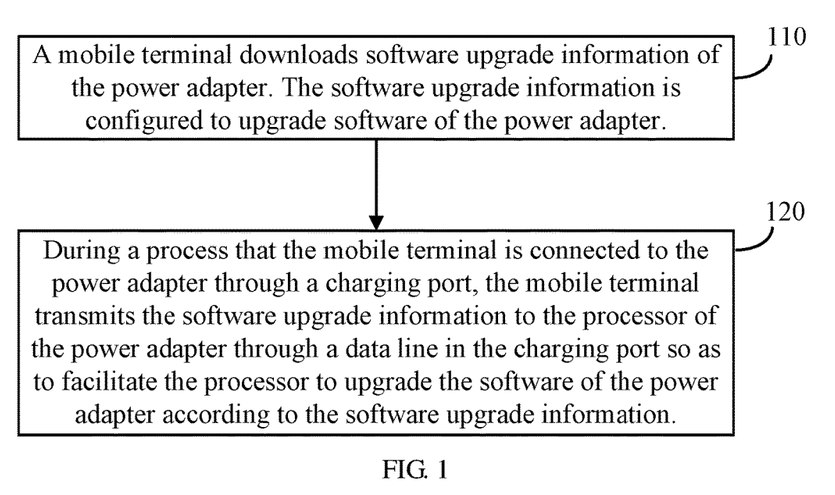
FIG. 1 is a schematic flowchart of an upgrade method of a power adapter according to one embodiment of the present disclosure.

Refer to FIG. 1, FIG. 1 is a schematic flowchart of an upgrade method of a power adapter according to one embodiment of the present disclosure. The method shown in FIG. 1 includes:

Block 110: a mobile terminal downloads software upgrade information of the power adapter. The software upgrade information is configured to upgrade software of the power adapter.

In the embodiment of the present disclosure, the software upgrade information of the power adapter is not limited to any specific form. For example, the software upgrade information can be firmware of a processor inside the power adapter.

The mobile terminal can be a cell phone, a tablet, etc.

The mobile terminal can include an application processor (AP) and an MCU (such as a baseband processor). The AP of the mobile terminal can take the responsibility of relevant functions of an intelligent terminal, such as downloading and managing applications (APP). The MCU of the mobile terminal can take the responsibility of some basic functions, such as text messaging and calling. The software upgrade information can be information downloaded from network by the AP in the mobile terminal through a radio frequency controller. For example, the AP downloads the software upgrade information through cellular network or WIFI.

Block 120: during a process that the mobile terminal is connected to the power adapter through a charging port, the mobile terminal transmits the software upgrade information to the processor of the power adapter through a data line in the charging port so as to facilitate the processor to upgrade the software of the power adapter according to the software upgrade information.

According to the embodiment of the present disclosure, the mobile terminal is utilized to download the software upgrade information of the power adapter, and the most updated software upgrade information is transmitted to the power adapter during the process that the mobile terminal is connected to the power adapter. The power adapter is thus upgraded to solve the problem that the power adapter is difficult to upgrade. When the power adapter is found to have a bug, or when the software of the adapter is upgraded, there is no need to return the adapter to the manufacturer. Using the mobile terminal to directly download new software upgrade information from network will work.

The above charging port can be a universal serial bus (USB) port. The USB port can be a typical USB port, or a micro USB port. The data line in the charging port can be at least one of D+ line and D− line in the USB port.

In addition, the processor in the power adapter is not limited according to the embodiment of the present disclosure. For example, the processor can be some model of MCU.

Currently, in the field of quick charging, the main ports of the processor of the power adapter, such as an Inter-Integrated Circuit (I2C) port, are occupied. These ports respectively have tasks need to be completed or functions need to be achieved. Under normal circumstances, a universal asynchronous receiver/transmitter (UART) port of the processor of the power adapter is not fully utilized. Hence, in order to complete the upgrade of the power adapter, the above software upgrade information can be converted into data in UART format, then the UART port of the processor of the power adapter receives the data in UART format. The method of converting the software upgrade information into the data in UART format is not limited according to the embodiment of the present disclosure. The software upgrade information can be converted into the data in UART format by the mobile terminal, then the mobile terminal transmits the data in UART format to the UART port of the processor of the power adapter through the data line in the charging port. Conversion of the software upgrade information can be completed by the AP of the mobile terminal, or can be completed by the MCU of the mobile terminal. In the following, a detailed description is provided by taking the AP of the mobile terminal to perform conversion of the software upgrade information as an example.

Optionally, in one embodiment, the mobile terminal converting the software upgrade information into the data in the UART format includes: The AP of the mobile terminal converting the downloaded software upgrade information into data in an I2C format; the AP of the mobile terminal utilizing the I2C port to transmit the data in the I2C format to the MCU of the mobile terminal; the MCU of the mobile terminal converting the data in the I2C format into the data in the UART format to transmit the data in the UART format to the UART port of the processor of the power adapter through the data line in the charging port.

In the embodiment of the present disclosure, after the AP of the mobile terminal transmits the downloaded software upgrade information to the MCU of the mobile terminal through the I2C port of the processor, the MCU of the mobile terminal converts the software upgrade information in the I2C format into the data in the UART format and transmits it to the power adapter, thus solving the problem that the power adapter does not have sufficient special purpose ports. In addition, in the related art, a communication link is established between the MCU of the mobile terminal and the processor of the adapter. Hence, the MCU of the mobile terminal can use the conventional communication link to transmit the software upgrade information to the power adapter. Additionally, completing the above format conversion by utilizing the MCU of the mobile terminal can share the burden of the AP.

Optionally, in one embodiment, the method in FIG. 1 further includes: The MCU of the mobile terminal transmitting a handshake request message to the power adapter, the handshake request message being configured to enquire about a version of the software currently used by the power adapter; the MCU of the mobile terminal receiving a handshake response message transmitted by the power adapter, the handshake response message including a message configured to indicate the version of the software currently used by the power adapter; the MCU of the mobile terminal determining whether the software currently used by the power adapter needs to be upgraded according to the version of the software currently used by the power adapter and the most updated version indicated by the downloaded software upgrade information; the MCU of the mobile terminal transmitting the data in the UART format to the UART port of the processor of the power adapter including: The MCU of the mobile terminal transmitting the data in the UART format to the UART port of the processor of the power adapter when determining that the software currently used by the power adapter needs to be upgraded.

The above handshake process can also be performed by the AP of the mobile terminal.

The method in FIG. 1 further includes: The AP of the mobile terminal determining whether the power supply device plugged in is the power adapter through a first link, wherein the first link connects the USB port of the AP and the charging port; the mobile terminal switching from the first link to the second link through the USB switch when determining that the power supply device plugged in is the power adapter, the second link connecting the MCU of the mobile terminal and the charging port; the MCU of the mobile terminal transmitting the data in the UART format to the UART port of the processor of the power adapter including: The MCU of the mobile terminal transmitting the data in the UART to the UART port of the processor of the power adapter through the second link.

In block 120, the mobile terminal can transmit the software upgrade information to the power adapter during the charging process, or the mobile terminal can transmit the software upgrade information to the power adapter before charging or after charging. The embodiment of the present disclosure would not limit in this regard. In the following, an embodiment is provided.

Optionally, in one embodiment, block 120 can include: The mobile terminal transmitting the software upgrade information to the processor of the power adapter through the data line in the charging port during a process that the power adapter uses a normal charging mode to charge the mobile terminal. The method in FIG. 1 can further include: The mobile terminal switching from the normal charging mode to a quick charging mode after the power adapter upgrades the software of the power adapter according to the software upgrade information, wherein a charging speed of the quick charging mode is greater than a charging speed of the normal charging mode.

In the embodiment of the present disclosure, the power adapter first uses the normal charging mode to charge the mobile terminal, and the mobile terminal transmits the software upgrade information to the power adapter during the normal charging process. After the power adapter completes the upgrade, the normal charging mode is switched to the quick charging mode. In this manner, it is ensured that the power adapter can be upgraded in time and the power adapter always uses the most updated software to provide the mobile terminal with the charging service.

Reference will now be made to examples to provide a detailed description of the embodiments of the present disclosure. In the following examples, a mobile terminal is a cell phone. The cell phone includes an AP and an MCU. A processor of the power adapter (hereinafter referred to as an adapter) is an MCU. Software upgrade information of the adapter is firmware of the MCU of the adapter. The cell phone downloads the firmware of the MCU of the adapter to the AP through the OTA technology. It should be noted that the examples in FIG. 2 to FIG. 6 are simply for facilitating the understanding of those of ordinary skill in the art, and are not intended to limit the embodiments of the present disclosure. Those of ordinary skill in the art can perform equivalent modifications or variations to the examples shown in FIG. 2 to FIG. 6, and these modifications or variations are within the scope of the embodiments of the present disclosure.

Figure 2:
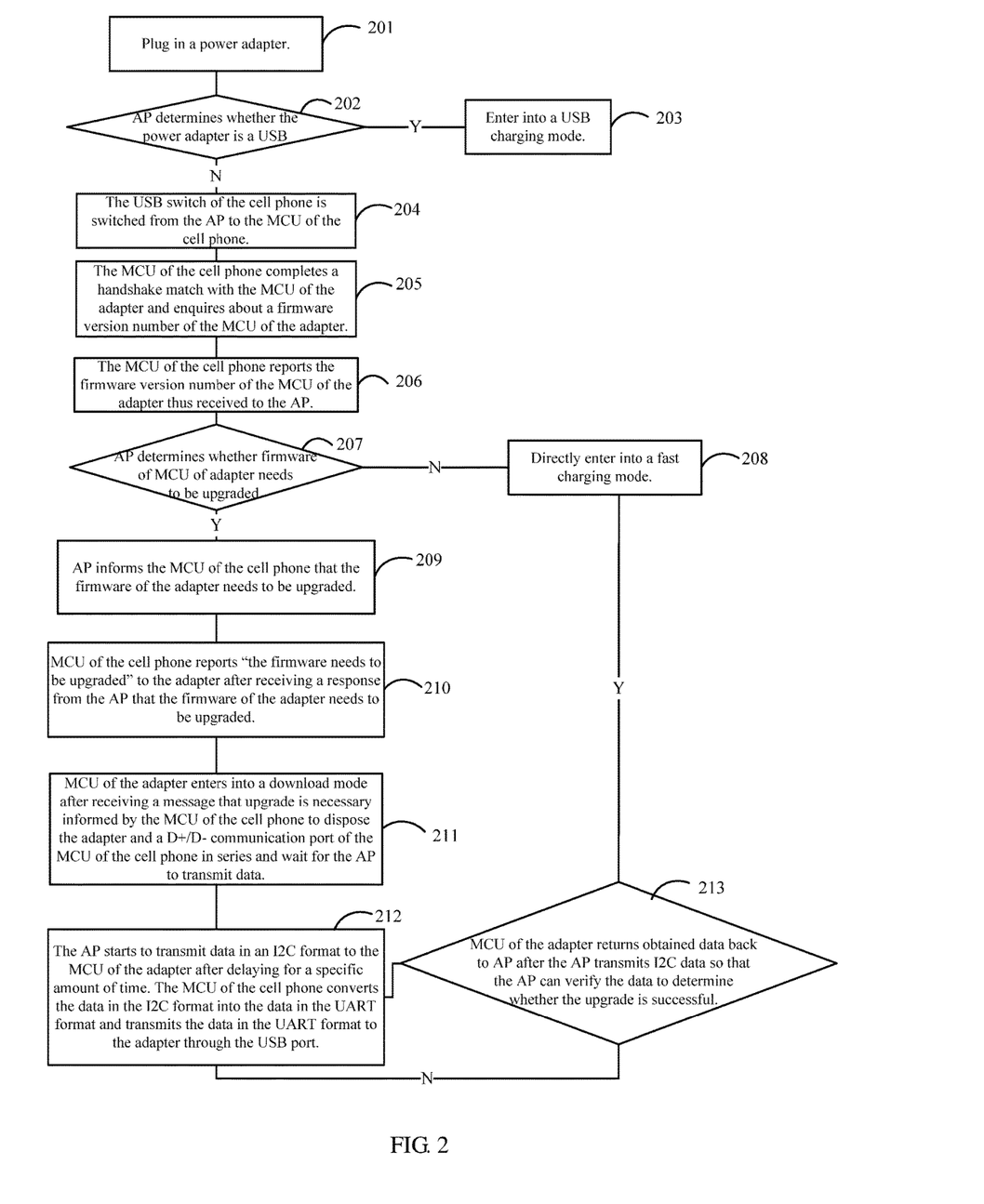
FIG. 2 is a schematic flowchart of an upgrade method of a power adapter according to one embodiment of the present disclosure.

FIG. 2 is a schematic flowchart of an upgrade method of a power adapter according to one embodiment of the present disclosure. The method in FIG. 2 includes:

Block 201: A power supply device is plugged into a cell phone.

Block 202: An AP of the cell phone determines whether the power supply device is an adapter. If the power supply device is not an adapter, go to block 203. If the power supply device is an adapter, go to block 204.

Figure 3:
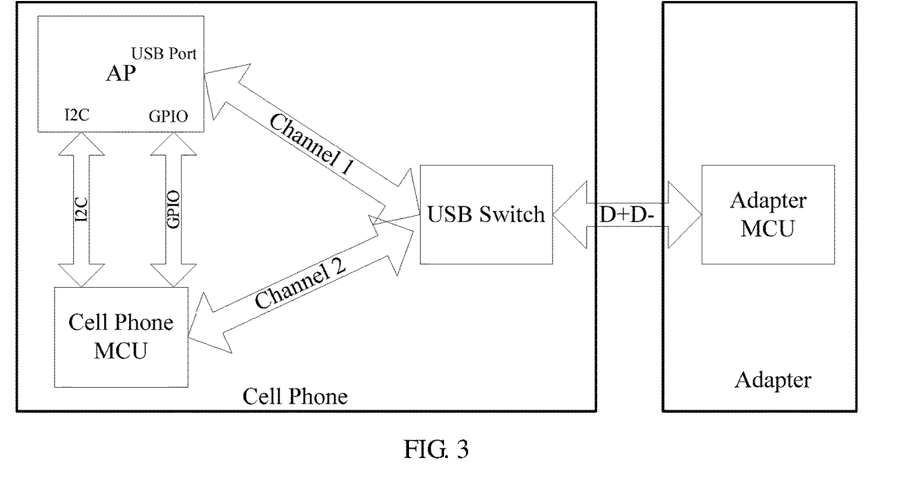
FIG. 3 is a schematic diagram of a system structure of a cell phone and a power adapter according to one embodiment of the present disclosure.
Figure 4:
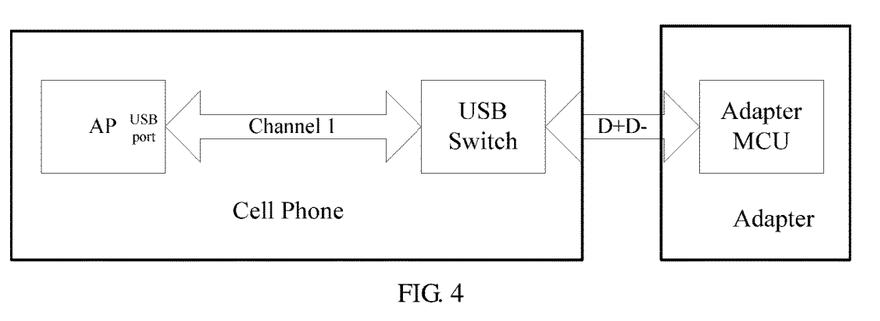
FIG. 4 is a schematic diagram of a communication link between an AP of a cell phone and a power adapter according to one embodiment of the present disclosure.

The cell phone includes the AP and an MCU. Both the AP and the MCU of the cell phone can communicate with an MCU of the adapter. As shown in FIG. 3, a USB switch can be disposed inside the cell phone so that a channel 1 and a channel 2 can be switched. When the USB switch is switched to the channel 1, the AP of the cell phone can communicate with the MCU of the adapter through a D+/D− line in the charging port. When the USB switch is switched to the channel 2, the MCU of the cell phone can communicate with the MCU of the adapter through the D+/D− line in the charging port. A default setting of the USB switch can be channel 1. When the power supply device is plugged in, the AP of the cell phone can identify whether it is the adapter. A communication link for the AP of the cell phone to identify the adapter is shown in FIG. 4.

Block 203: Enter into a non-adapter charging mode.

For example, the power supply device is a computer. The cell phone is plugged into the computer so that the computer can be utilized to provide the cell phone with power.

Block 204: The USB switch of the cell phone is switched from the AP to the MCU of the cell phone.

Block 205: The MCU of the cell phone completes a handshake match with the MCU of the adapter and enquires about a firmware version number of the MCU of the adapter.

Figure 5:
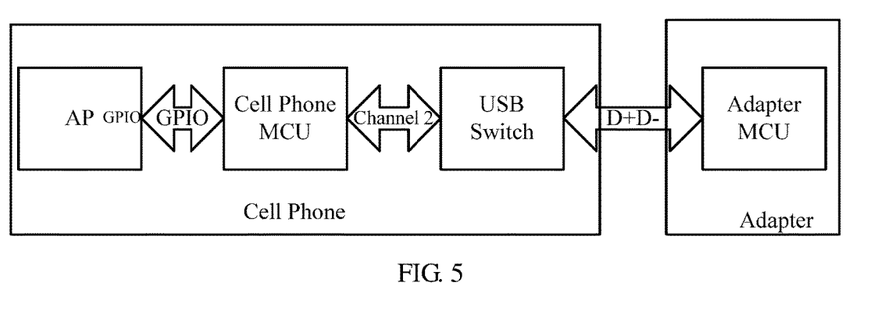
FIG. 5 is a schematic diagram of a communication link between an MCU of a cell phone and a power adapter according to one embodiment of the present disclosure.

A communication link for a handshake negotiation process between the MCU of the cell phone and the adapter can be shown in FIG. 5. Under the circumstances, the setting of the USB switch is channel 2.

Block 206: The MCU of the cell phone reports the firmware version number of the MCU of the adapter thus received to the AP.

Block 207: The AP determines whether firmware of the MCU of the adapter needs to be upgraded. If the firmware of the MCU of the adapter does not need to be upgraded, perform block 208; if the firmware of the MCU of the adapter needs to be upgraded, perform block 209.

Block 208: Directly enter into a quick charging mode.

Block 209: The AP informs the MCU of the cell phone that the firmware of the adapter needs to be upgraded.

Block 210: The MCU of the cell phone reports "the firmware needs to be upgraded" to the adapter after receiving a response from the AP that the firmware of the adapter needs to be upgraded.

Figure 6:
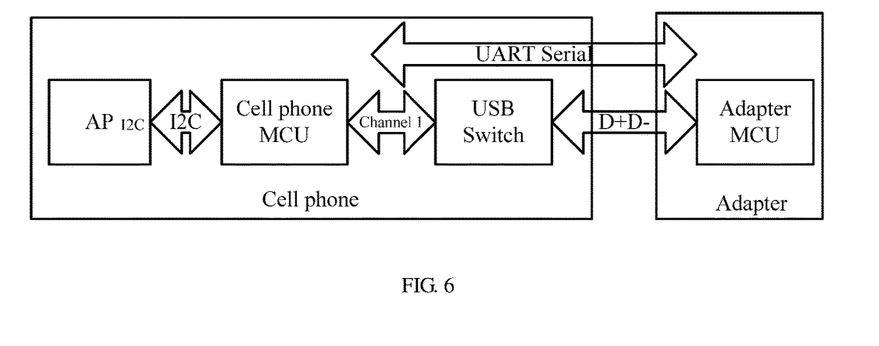
FIG. 6 is a schematic diagram of a data link used by an AP of a cell phone to transmit adapter firmware to a power adapter.

Refer to FIG. 6, FIG. 6 is a communication link between an AP of a cell phone, an MCU of the cell phone, an MCU of an adapter when upgrading firmware of the adapter, which is equivalent to establishing a direct UART serial connection between the MCU and the MCU of the adapter.

Block 211: The MCU of the adapter enters into the download mode after receiving the message that the upgrade is necessary informed by the MCU of the cell phone to dispose the adapter and the D+/D− communication port of the MCU of the cell phone in series and wait for the AP to transmit the data.

Block 212: The AP starts to transmit data in an I2C format to the MCU of the adapter after delaying for a specific amount of time. The MCU of the cell phone converts the data in the I2C format into the data in the UART format and transmits the data in the UART format to the adapter through the USB port.

The delay time can be preset. When the delay time is reached, the AP can regard that both the MCU of the cell phone and the MCU of the adapter are ready and start to transmit the data in the UART format to the MCU of the adapter.

Block 213: The MCU of the adapter returns the obtained data back to the AP after the AP transmitting the data in the I2C format so that the AP can verify the data to determine whether the upgrade is successful. If the upgrade is determined to be successful, perform block 208; if the upgrade is determined not to be successful, perform block 212.

In the above, the upgrade method of the power adapter according to the embodiments of the present disclosure is described in detail from the view point of the mobile terminal with reference to FIG. 1. In the following, the upgrade method of the power adapter according to the embodiments of the present disclosure is described from the view point of the power adapter with reference to FIG. 7.

Since the interactions between, relevant features and functions of the power adapter and the mobile terminal from the view point of the mobile terminal correspond to those from the view point of the power adapter, a repeat description is not provided wherever possible to simplify matters.

Figure 7:
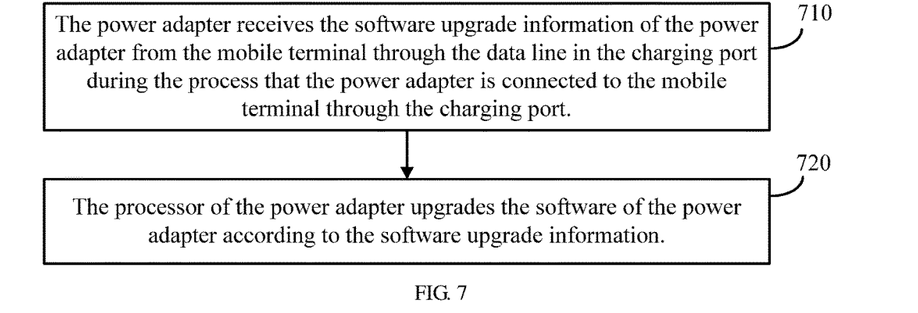
FIG. 7 is a schematic flowchart of an upgrade method of a power adapter according to one embodiment of the present disclosure.

FIG. 7 is a schematic flowchart of an upgrade method of a power adapter according to one embodiment of the present disclosure. The method in FIG. 7 includes:

Block 710: The power adapter receives the software upgrade information of the power adapter from the mobile terminal through the data line in the charging port during the process that the power adapter is connected to the mobile terminal through the charging port.

Block 720: The processor of the power adapter upgrades the software of the power adapter according to the software upgrade information.

According to the embodiment of the present disclosure, the mobile terminal is utilized to download the software upgrade information of the power adapter, and transmit the most updated software upgrade information to the power adapter during the process that the mobile terminal is connected to the power adapter. The power adapter is thus upgraded to resolve the problem that the power adapter is difficult to upgrade.

Optionally, in one embodiment, block 710 can include: The power adapter receives the data in UART format transmitted from the mobile terminal through the UART port of the processor. The data in UART format is formed by converting the software upgrade information by the mobile terminal.

Optionally, in one embodiment, the power adapter receiving the data in UART format transmitted from the mobile terminal through the UART port of the processor includes: The power adapter receiving the data in UART format transmitted from the MCU of the mobile terminal through the UART port of the processor. The data in UART format is from a conversion of software update information in I2C format received by the AP of the mobile terminal by using the MCU of the mobile terminal.

Optionally, in one embodiment, the software upgrade information is information downloaded from network by the AP in the mobile terminal through the radio frequency controller.

Optionally, in one embodiment, the method in FIG. 7 can further include: The power adapter receiving the handshake request message from the mobile terminal, the handshake request message being configured to enquire about the version of the software currently used by the power adapter; the power adapter transmitting the handshake response message to the mobile terminal, the handshake response message including the message configured to indicate the version of the software currently used by the power adapter; the power adapter receiving the software upgrade information of the power adapter from the mobile terminal including: The power adapter receiving the software upgrade information of the power adapter from the mobile terminal when the mobile terminal determines that the software currently used by the power adapter needs to be upgraded according to the most updated version indicated by the software upgrade information.

Optionally, in one embodiment, the power adapter receiving the software upgrade information of the power adapter from the mobile terminal through the data line in the charging port during the process that the power adapter is connected to the mobile terminal through the charging port includes: The power adapter receiving the software upgrade information of the power adapter from the mobile terminal through the data line in the charging port during the process that the power adapter uses the normal charging mode to charge the mobile terminal; the method further includes: The power adapter switching from the normal charging mode to the quick charging mode after the power adapter upgrades the software of the power adapter according to the software upgrade information, wherein the charging speed of the quick charging mode is greater than the charging speed of the normal charging mode.

Optionally, in one embodiment, the charging port is the USB port. The data line in the charging port is at least one of the D+ line and the D− line in the USB port.

In the above, the upgrade methods of the power adapters according to the embodiments of the present disclosure are described in detail with reference to FIG. 1 to FIG. 7. In the following, the mobile terminals and power adapters according to the embodiments of the present disclosure are described in detail with reference to FIG. 8 to FIG. 11. The mobile terminals and the power adapters in FIG. 8 to FIG. 11 can realize the various steps performed by the mobile terminals and the power adapters shown in FIG. 1 to FIG. 7. A detailed description is not provided to avoid repetition.

Figure 8:
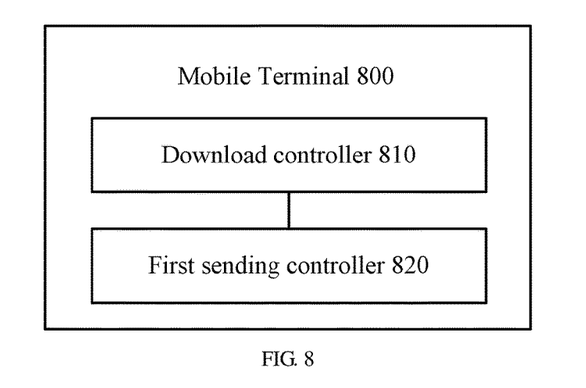
FIG. 8 is a schematic block diagram of a mobile terminal according to one embodiment of the present disclosure.

FIG. 8 is a schematic block diagram of a mobile terminal according to one embodiment of the present disclosure. A mobile terminal 800 in FIG. 8 includes:

A download controller 810 configured to download the software upgrade information of the power adapter. The software upgrade information is configured to upgrade the software of the power adapter.

A first sending controller 820 configured to transmit the software upgrade information to the processor of the power adapter through the data line in the charging port during the process that the mobile terminal 800 is connected to the power adapter through the charging port to facilitate the processor to upgrade the software of the power adapter according to the software upgrade information.

In the embodiment of the present disclosure, the mobile terminal is utilized to download the software upgrade information of the power adapter, and transmit the most updated software upgrade information to the power adapter during the process that the mobile terminal is connected to the power adapter. The power adapter is thus ungraded to solve the problem that the power adapter is difficult to upgrade.

Optionally, in one embodiment, the first sending controller 820 can be configured to convert the software upgrade information into the data in UART format; transmit the data in UART format to the UART port of the processor of the power adapter through the data line in the charging port.

Optionally, in one embodiment, the first sending controller 820 can be specifically configured to convert the downloaded software upgrade information into the data in the I2C format through the AP of the mobile terminal 800; transmit the data in the I2C format to the MCU of the mobile terminal 800 by utilizing the I2C port through the AP of the mobile terminal 800; convert the data in the I2C format into the data in the UART format through the MCU of the mobile terminal 800 to transmit the data in the UART format to the UART port of the processor of the power adapter through the data line in the charging port.

Optionally, in one embodiment, the mobile terminal 800 can further include: The second sending controller configured to transmit the handshake request message to the power adapter through the MCU of the mobile terminal, the handshake request message being configured to enquire about the version of the software currently used by the power adapter; the receiving controller configured to receive the handshake response message transmitted by the power adapter through the MCU of the mobile terminal, the handshake response message including the message configured to indicate the version of the software currently used by the power adapter;

the determination controller configured to determine whether the software currently used by the power adapter needs to be upgraded according to the version of the software currently used by the power adapter and the most updated version indicated by the downloaded software upgrade information. The first sending controller 820 is configured to transmit the data in UART format to the UART port of the processor of the power adapter through the MCU of the mobile terminal when determining that the software currently used by the power adapter needs to be upgraded.

Optionally, in one embodiment, the mobile terminal 800 can further include: a judge controller configured to determine whether the power supply device plugged in is the power adapter through the first link, wherein the first link connects the USB port of the AP and the charging port; a link switching controller configured to switch the mobile terminal from the first link to the second link through the USB switch when determining that the power supply device plugged in is the power adapter, where the second link connects the MCU of the mobile terminal and the charging port. The first sending controller 820 is configured to transmit the data in UART format to the UART port of the processor of the power adapter through the second link.

Optionally, in one embodiment, the software upgrade information is the information downloaded from the network by the AP in the mobile terminal through the radio frequency controller.

Optionally, in one embodiment, the first sending controller 820 can be specifically configured to transmit the software upgrade information to the processor of the power adapter through the data line in the charging port during the process that the power adapter uses the normal charging mode to charge the mobile terminal 800. The mobile terminal 800 can further include: a switch controller configured to switch from the normal charging mode to the quick charging mode after the power adapter upgrades the software of the power adapter according to the software upgrade information, wherein the charging speed of the quick charging mode is greater than the charging speed of the normal charging mode.

Optionally, in one embodiment, the charging port can be the USB port. The data line in the charging port is at least one of the D+ line and the D− line in the USB port.

Figure 9:
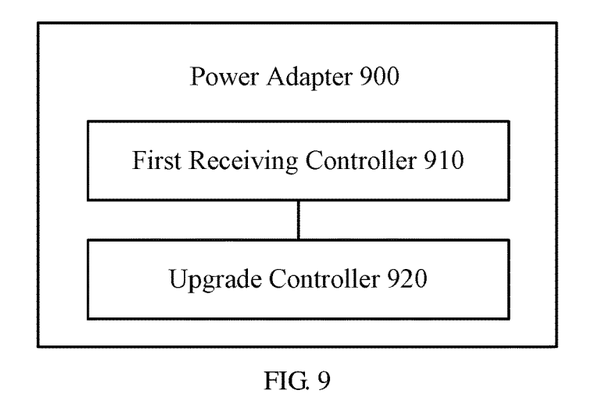
FIG. 9 is a schematic block diagram of a power adapter according to one embodiment of the present disclosure.

FIG. 9 is a schematic block diagram of a power adapter according to one embodiment of the present disclosure. The power adapter 900 in FIG. 9 includes:

A first receiving controller 910 configured to receive the software upgrade information of the power adapter 900 from the mobile terminal through the data line in the charging port during the process that the power adapter 900 is connected to the mobile terminal through the charging port;

An upgrade controller 920 configured to upgrade the software of the power adapter 900 through the processor of the power adapter 900 according to the software upgrade information.

According to the embodiment of the present disclosure, the mobile terminal is utilized to download the software upgrade information of the power adapter, and transmit the most updated software upgrade information to the power adapter during the process that the mobile terminal is connected to the power adapter so as to upgrade the power adapter. The problem that the power adapter is difficult to upgrade is solved.

Optionally, in one embodiment, the first receiving controller 910 can be specifically configured to receive the data in UART format transmitted by the mobile terminal through the UART port of the processor. The data in UART format is formed by converting the software upgrade information by the mobile terminal.

Optionally, in one embodiment, the first sending controller 910 can be specifically configured to receive the data in UART format transmitted from the GPIO port of the AP of the mobile terminal through the UART port of the processor. The GPIO port is configured to simulate the UART port to transmit the data in UART format.

Optionally, in one embodiment, the software upgrade information can be the information downloaded from the network by the AP in the mobile terminal through the radio frequency controller.

Optionally, in one embodiment, the power adapter 900 can further include: a second receiving controller configured to receive the handshake request message from the mobile terminal, the handshake request message being configured to enquire about the version of the software currently used by the power adapter 900; a sending controller configured to transmit the handshake response message to the mobile terminal, the handshake response message including the message configured to indicate the version of the software currently used by the power adapter 900. The first receiving controller 910 can be specifically configured to receive the software upgrade information of the power adapter 900 from the mobile terminal when the mobile terminal determines that the software currently used by the power adapter 900 needs to be upgraded according to the most updated version indicated by the software upgrade information.

Optionally, in one embodiment, the first receiving controller 910 can be specifically configured to allow the power adapter 900 to receive the software upgrade information of the power adapter 900 from the mobile terminal through the data line in the charging port during the process that the power adapter 900 uses the normal charging mode to charge the mobile terminal. The power adapter 900 can further include: a switch controller configured to switch the power adapter 900 from the normal charging mode to the quick charging mode after the power adapter 900 upgrades the software of the power adapter 900 according to the software upgrade information, wherein the charging speed of the quick charging mode is greater than the charging speed of the normal charging mode.

Optionally, in one embodiment, the charging port is the USB port. The data line in the charging port is at least one of the D+ line and the D− line in the USB port.

Figure 10:
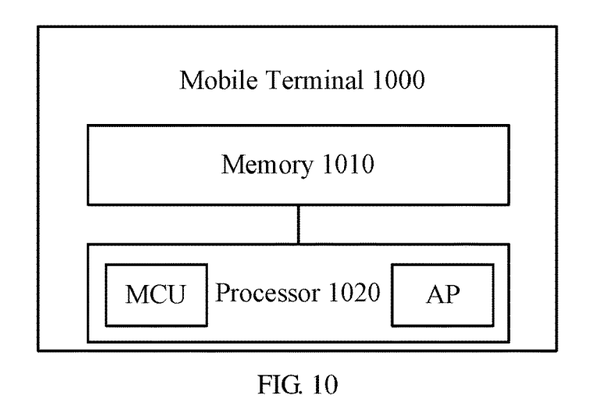
FIG. 10 is a schematic block diagram of a mobile terminal according to one embodiment of the present disclosure.

FIG. 10 is a schematic block diagram of a mobile terminal according to one embodiment of the present disclosure. A mobile terminal 1000 in FIG. 10 includes:

a memory 1010 configured to store a program;

a processor 1020 configured to execute the program, when the program is executed, the processor 1020 being configured to download the software upgrade information of the power adapter, the software upgrade information being configured to upgrade the software of the power adapter; transmit the software upgrade information to the processor of the power adapter through the data line in the charging port during the process that the mobile terminal 1000 is connected to the power adapter through the charging port to facilitate the processor to upgrade the software of the power adapter according to the software upgrade information.

In the embodiment of the present disclosure, the mobile terminal is utilized to download the software upgrade information of the power adapter, and the most updated software update information is transmitted to the power adapter during the process that the mobile terminal is connected to the power adapter, the power adapter is thus upgraded to solve the problem that the power adapter is difficult to upgrade.

Optionally, in one embodiment, the processor 1020 can be specifically configured to convert the software upgrade information into the data in UART format; transmit the data in UART format to the UART port of the processor of the power adapter through the data line in the charging port.

Optionally, in one embodiment, the processor 1020 includes the AP and the MCU. The AP can be specifically configured to convert the downloaded software upgrade information into the data in the I2C format; a general purpose I2C port is utilized to transmit the data in the I2C format to the MCU of the mobile terminal 1000; the MCU converts the data in the I2C format into the data in the UART format to transmit the data in the UART format to the UART port of the processor of the power adapter through the data line in the charging port.

Optionally, in one embodiment, the processor 1020 can include the MCU. The MCU transmits the handshake request message to the power adapter, the handshake request message is configured to enquire about the version of the software currently used by the power adapter; the MCU receives the handshake response message transmitted by the power adapter, the handshake response message includes the message configured to indicate the version of the software currently used by the power adapter; the MCU determines whether the software currently used by the power adapter needs to be upgraded according to the version of the software currently used by the power adapter and the most updated version indicated by the downloaded software upgrade information; the MCU transmits the data in UART format to the UART port of the processor of the power adapter when determining that the software currently used by the power adapter needs to be upgraded.

Optionally, in one embodiment, the processor 1020 can further include the AP. The AP determines whether the power supply device plugged in is the power adapter through the first link, the first link connects the USB port of the AP and the charging port; the AP switches from the first link to the second link through the USB switch when determining that the power supply device plugged in is the power adapter, the second link connects the MCU of the mobile terminal and the charging port; the MCU can be specifically configured to transmit the data in UART format to the UART port of the processor of the power adapter through the second link.

Optionally, in one embodiment, the software upgrade information is the information downloaded from the network by the AP in the mobile terminal through the radio frequency controller.

Optionally, in one embodiment, the processor 1020 can be specifically configured to transmit the software upgrade information to the processor of the power adapter through the data line in the charging port during the process that the power adapter uses the normal charging mode to charge the mobile terminal 1000. The processor 1020 can further be configured to switch from the normal charging mode to the quick charging mode after the power adapter upgrades the software of the power adapter according to the software upgrade information, wherein the charging speed of the quick charging mode is greater than the charging speed of the normal charging mode.

Optionally, in one embodiment, the charging port can be the USB port. The data line in the charging port is at least one of the D+ line and the D− line in the USB port.

Figure 11:
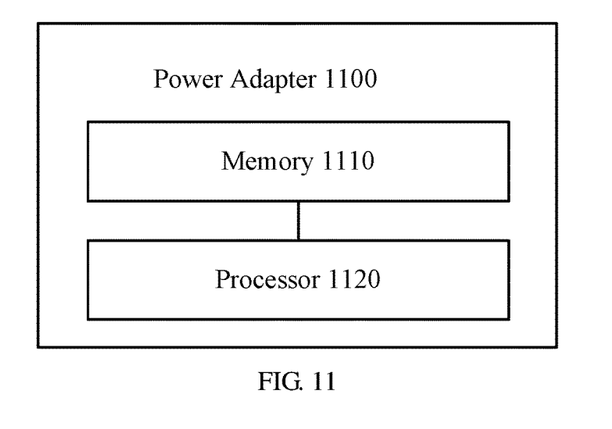
FIG. 11 is a schematic block diagram of a power adapter according to one embodiment of the present disclosure.

FIG. 11 is a schematic block diagram of a power adapter according to one embodiment of the present disclosure. A power adapter 1100 in FIG. 11 includes:

a memory 1110 configured to store a program;

a processor 1120 configured to execute the program, when the program is executed, the processor 1120 being configured to receive the software upgrade information of the power adapter 1100 from the mobile terminal through the data line in the charging port during the process that the power adapter 1100 is connected to the mobile terminal through the charging port; upgrade the software of the power adapter 1100 according to the software upgrade information.

According to the embodiment of the present disclosure, the mobile terminal is utilized to download the software upgrade information of the power adapter, and the most updated software update information is transmitted to the power adapter during the process that the mobile terminal is connected to the power adapter, the power adapter is thus upgraded to solve the problem that the power adapter is difficult to upgrade.

Optionally, in one embodiment, the processor 1120 can be specifically configured to receive the data in UART format transmitted by the mobile terminal through the UART port of the processor 1120. The data in UART format is formed by converting the software upgrade information by the mobile terminal.

Optionally, in one embodiment, the processor 1120 can be specifically configured to receive the data in the UART format transmitted by the MCU of the mobile terminal through the UART port of the processor 1120. The data in the UART format is formed by converting the software upgrade information in the I2C format received from the AP of the mobile terminal through the MCU of the mobile terminal.

Optionally, in one embodiment, the software upgrade information can be the information downloaded from the network by the AP in the mobile terminal through the radio frequency controller.

Optionally, in one embodiment, the processor 1120 can further be configured to receive the handshake request message from the mobile terminal, the handshake request message is configured to enquire about the version of the software currently used by the power adapter 1100; transmit the handshake response message to the mobile terminal, the handshake response message includes the message configured to indicate the version of the software currently used by the power adapter 1100; receive the software upgrade information of the power adapter 1100 from the mobile terminal when the mobile terminal determines that the software currently used by the power adapter 1100 needs to be upgraded according to the most updated version indicated by the software upgrade information.

Optionally, in one embodiment, the processor 1120 can be specifically configured to receive the software upgrade information of the power adapter 1100 from the mobile terminal through the data line in the charging port during the process that the power adapter 1100 uses the normal charging mode to charge the mobile terminal. The processor 1120 can further be configured to switch the power adapter 1100 from the normal charging mode to the quick charging mode after the power adapter 1100 upgrades the software of the power adapter 1100 according to the software upgrade information. The charging speed of the quick charging mode is greater than the charging speed of the normal charging mode.

Optionally, in one embodiment, the charging port can be the USB port. The data line in the charging port is at least one of the D+ line and the D− line in the USB port.

The one having ordinary skill in the art understand that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. The one having ordinary skill in the art can use different ways to realize the function for each specific application while such realizations should not go beyond the scope of the present disclosure.

It is understood by the one having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments.

Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a U disk, a mobile hard disk, a read-only memory (ROM), a random access memory (RAM), a floppy disk, or other kinds of media capable of storing program codes.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

What is claimed is:

1. A method of upgrading a power adapter comprising:

downloading software upgrade information of the power adapter by a mobile terminal, the software upgrade information configured to upgrade software of the power adapter; and converting the software upgrade information into data in a Universal Asynchronous Receiver/Transmitter (UART) format by the mobile terminal and transmitting the data in UART format to a UART port of a processor of the power adapter by the mobile terminal through a data line in a charging port during a process that the mobile terminal is connected to the power adapter through the charging port to facilitate the processor to upgrade the software of the power adapter according to the software upgrade information;

transmitting a handshake request message to the power adapter by the MCU of the mobile terminal, the handshake request message being configured to enquire about a version of the software currently used by the power adapter;

receiving a handshake response message transmitted by the power adapter by the MCU of the mobile terminal, the handshake response message including a message configured to indicate the version of the software currently used by the power adapter;

causing the power adapter to charge the mobile terminal when determining that the software currently used by the power adapter does not need to be upgraded by the MCU of the mobile terminal according to the version of the software currently used by the power adapter and a most updated version indicated by the downloaded software upgrade information; and transmitting the data in the UART format to the UART port of the processor of the power adapter by the MCU of the mobile terminal when determining that the software currently used by the power adapter needs to be upgraded.

2. The method as claimed in claim 1, wherein the mobile terminal converts the software upgrade information into the data in the UART format comprises:

converting downloaded software upgrade information into data in an I2C format by an AP of the mobile terminal;

utilizing an I2C port by the AP of the mobile terminal to transmit the data in the I2C format to an MCU of the mobile terminal; and converting the data in the I2C format into the data in the UART format by the MCU of the mobile terminal to transmit the data in the UART format to the UART port of the processor of the power adapter by the MCU of the mobile terminal through the data line in the charging port.

3. The method as claimed in claim 1, further comprising:

determining whether a power supply device plugged in is the power adapter by the AP of the mobile terminal through a first link, wherein the first link connects a USB port of the AP and the charging port; and switching the mobile terminal from the first link to a second link through the USB switch when determining that the power supply device plugged in is the power adapter, wherein the second link connects the MCU of the mobile terminal and the charging port;

transmitting the data in the UART format to the UART port of the processor of the power adapter by the MCU of the mobile terminal comprising:

transmitting the data in the UART format to the UART port of the processor of the power adapter by the MCU of the mobile terminal through the second link.

4. A method of upgrading a power adapter comprising:

receiving software upgrade information of the power adapter from a mobile terminal by the power adapter through a data line in a charging port during a process that the power adapter is connected to the mobile terminal through the charging port;

upgrading software of the power adapter by a processor of the power adapter according to the software upgrade information;

receiving a handshake request message from the mobile terminal by the power adapter, the handshake request message configured to enquire about a version of the software currently used by the power adapter; and transmitting a handshake response message to the mobile terminal by the power adapter, the handshake response message including a message configured to indicate the version of the software currently used by the power adapter;

charging the mobile terminal by the power adapter when the mobile terminal determines that the software currently used by the power adapter does not need to be upgraded according to the version of the software currently used by the power adapter and a most updated version indicated by the software upgrade information; and receiving the software upgrade information of the power adapter from the mobile terminal by the power adapter when the mobile terminal determines that the software currently used by the power adapter needs to be upgraded according to the most updated version indicated by the software upgrade information.

5. The method as claimed in claim 4, wherein the step that the power adapter receives the software upgrade information of the power adapter from the mobile terminal through the data line in the charging port comprises:

receiving data in a Universal Asynchronous Receiver/Transmitter (UART) format transmitted by the mobile terminal by the power adapter through a UART port of the processor, wherein the data in UART format is formed by converting the software upgrade information by the mobile terminal.

6. The method as claimed in claim 4, wherein receiving the data in the UART format transmitted by the mobile terminal by the power adapter through the UART port of the processor comprises:

receiving the data in the UART format transmitted by the MCU of the mobile terminal by the power adapter through the UART port of the processor, wherein the data in the UART format is formed by converting the software upgrade information in an I2C format received from an AP of the mobile terminal through the MCU of the mobile terminal.

7. A mobile terminal comprising:

a download controller configured to download software upgrade information of a power adapter, the software upgrade information configured to upgrade software of the power adapter; and a first sending controller configured to convert the software upgrade information into data in a Universal Asynchronous Receiver/Transmitter (UART) format by the mobile terminal and transmit the data in UART format to a UART port of a processor of the power adapter through a data line in a charging port during a process that the mobile terminal is connected to the power adapter through the charging port to facilitate the processor to upgrade the software of the power adapter according to the software upgrade information;
a second sending controller configured to transmit a handshake request message to the power adapter through the MCU of the mobile terminal, the handshake request message configured to enquire about a version of the software currently used by the power adapter;
a receiving controller configured to receive a handshake response message transmitted by the power adapter through the MCU of the mobile terminal, the handshake response message including a message configured to indicate the version of the software currently used by the power ter;
a charging controller configured to cause the power adapter to charge the mobile terminal when determining that the software currently used by the power adapter does not need to be upgraded according to the version of the software currently used by the power adapter and a most updated version indicated by the downloaded software upgrade information;
wherein the first sending controller is configured to transmit the data in UART format to the UART port of the processor of the power adapter through the MCU of the mobile terminal when determining that the software currently used by the power adapter needs to be upgraded.

8. The mobile terminal as claimed in claim 7, wherein the first sending controller is configured to:
convert downloaded software upgrade information into data in an I2C format through an AP of the mobile terminal;
utilize an I2C port to transmit the data in the I2C format to an MCU of the mobile terminal though the AP of the mobile terminal; and
convert the data in the I2C format into the data in the UART format through the MCU of the mobile terminal to transmit the data in the UART format to the UART port of the processor of the power adapter through the data line in the charging port.

9. The mobile terminal as claimed in claim 7, further comprising:
a judge controller configured to determine whether a power supply device plugged in is the power adapter through a first link, wherein the first link connects a USB port of the AP and the charging port; and
a link switching controller configured to switch the mobile terminal from the first link to a second link through the USB switch when determining that the power supply device plugged in is the power adapter, wherein the second link connects the MCU of the mobile terminal and the charging port;
the first sending controller being configured to transmit the data in UART format to the UART port of the processor of the power adapter through the second link.

10. The mobile terminal as claimed in claim 7, wherein the first sending controller is configured to transmit the software upgrade information to the processor of the power adapter through the data line in the charging port during a process that the power adapter uses a normal charging mode to charge the mobile terminal, the mobile terminal further comprises:
a switch controller configured to switch the power adapter from the normal charging mode to the quick charging mode after the power adapter upgrades the software of the power adapter according to the software upgrade information, wherein a charging speed of the quick charging mode is greater than a charging speed of the normal charging mode.

11. A power adapter comprising:
a first receiving controller configured to receive software upgrade information of the power adapter from a mobile terminal through a data line in a charging port during a process that the power adapter is connected to the mobile terminal through the charging port; and
an upgrade controller configured to upgrade software of the power adapter through the processor of the power adapter according to the software upgrade information;
wherein the power adapter further comprises:
a second receiving controller configured to receive a handshake request message from the mobile terminal, the handshake request message being configured to enquire about a version of the software currently used by the power adapter; and
a sending controller configured to transmit a handshake response message to the mobile terminal, the handshake response message including a message configured to indicate the version of the software currently used by the power adapter;
a charging controller configured to charge the mobile terminal when the mobile terminal determines that the software currently used by the power adapter does not need to be upgraded according to the version of the software currently used by the power adapter and a most updated version indicated by the software upgrade information;
wherein the first receiving controller is configured to receive the software upgrade information of the power adapter from the mobile terminal when the mobile terminal determines that the software currently used by the power adapter needs to be upgraded according to the most updated version indicated by the software upgrade information.

12. The power adapter as claimed in claim 11, wherein the first receiving controller is configured to receive data in a Universal Asynchronous Receiver/Transmitter (UART) format transmitted by the mobile terminal through a UART port of the processor, wherein the data in UART format is formed by converting the software upgrade information by the mobile terminal.

13. The power adapter as claimed in claim 11, wherein the first receiving controller is configured to receive the data in the UART format transmitted by an MCU of the mobile terminal through the UART port of the processor, wherein the data in the UART format is formed by converting the software upgrade information in an I2C format received from an AP of the mobile terminal through the MCU of the mobile terminal.

14. The power adapter as claimed in any one of claim 11, wherein the first receiving controller is configured to receive the software upgrade information of the power adapter from the mobile terminal by the power adapter through the data line in the charging port during a process that the power adapter uses a normal charging mode to charge the mobile terminal;
the power adapter further comprises:
a switch controller configured to switch the power adapter from the normal charging mode to the quick charging mode after the power adapter upgrades the software of the power adapter according to the software upgrade information, wherein a charging speed of the quick charging mode is greater than a charging speed of the normal charging mode.

* * * * *